United States Patent [19]

Kilgore

[11] Patent Number: 4,636,651

[45] Date of Patent: Jan. 13, 1987

[54] VEHICLE ANTI-THEFT SYSTEM WITH PRESSURE SENSITIVE SENSOR

[76] Inventor: Woodson B. Kilgore, 31827 Maine, Livonia, Mich. 48150

[21] Appl. No.: 697,162

[22] Filed: Feb. 1, 1985

Related U.S. Application Data

[63] Continuation-in-part of Ser. No. 418,719, Sep. 16, 1982, abandoned.

[51] Int. Cl.⁴ ............................................. B60R 25/04
[52] U.S. Cl. ................................ 307/10 AT; 340/64;
123/146.5 B; 180/287
[58] Field of Search ........................ 307/10 R, 10 AT;
340/64; 123/146.5 B; 180/287

[56] References Cited

U.S. PATENT DOCUMENTS 3,781,789 12/1973 Caleskie et al. ............ 307/10 AT X
3,968,474  7/1976 Danahey .................... 307/10 AT X
4,186,710  2/1980 Kilgore ...................... 307/10 AT X

*Primary Examiner*—A. D. Pellinen
*Assistant Examiner*—T. DeBoer
*Attorney, Agent, or Firm*—Charles W. Chandler

[57] ABSTRACT

An anti-theft device for an automotive vehicle in which the starter is grounded to the vehicle frame unless two switches are manipulated by the user. One switch is the key-operated ignition switch. The second switch is connected to an electrical relay to open one side of the grounded starter to turn over the engine.

In one embodiment, the second switch is a sensor located in a hidden place in the vehicle. In another embodiment, the second switch is connected between the battery and an electrical accessory that is energized independently of the position of the ignition switch, such as a powered-operated lock, a brake-operated switch or the like. The user must energize the second switch in order to open the connection between the starter and the ground before he can energize the starter by manipulating the key in the ignition switch.

In another embodiment of the invention, both sides of the ignition coil and the starter are normally grounded to the frame. Both can be energized only after the second switch is manipulated. The ignition switch is connected to a siren that is energized if the ignition switch is manipulated but the second switch is not, as by a thief.

1 Claim, 2 Drawing Figures

VEHICLE ANTI-THEFT SYSTEM WITH PRESSURE SENSITIVE SENSOR

CROSS-REFERENCE TO RELATED APPLICATION

This application is a continuation-in-part of U.S. application, Ser. No. 418,719 having a filing date of Sept. 16, 1982, and now abandoned.

BACKGROUND OF THE INVENTION

Motor vehicles are frequently stolen because the thief can circumvent the ignition switch, or the user forgets the key in the ignition switch. Some vehicles employ a so-called "kill switch" that interrupts the electrical connection between the ignition switch and the starter, however, this switch can often be circumvented by the thief who either hot wires the starter, or the owner either forgets to manipulate the "kill switch" or finds it too much of a nuisance and leaves it in its inoperative position. Such a system is basically an active system because it requires the user to actively take some measures to put the vehicle's electrical circuitry in an inoperative condition. If, as frequently happens, the user either forgets or does not desire to use the anti-theft system, the vehicle remains unprotected.

Still another problem is that some commercially available systems require the owner to maintain his door in a locked condition in order to set an alarm. As a result, the thief will break the window to gain access to the car.

My earlier U.S. Pat. No. 4,186,710, which was issued Feb. 5, 1980, disclosed a vehicle anti-theft system in which both terminals of the starter are grounded to the vehicle frame so that in the event that the thief hot wires the starter, the hot wire creates a short circuit and burns the thief.

SUMMARY OF THE INVENTION

The broad purpose of the present invention is to provide an improved vehicle anti-theft system in which both sides of the starter are grounded and can only be opened by a "passive system". "Passive" means that the user cannot forget to set or arm the system, he cannot forget to use it, he cannot shut it off, he cannot create a false alarm. In addition, the system does not run the battery down because it uses no power from the battery while the owner is absent from the vehicle. In fact, by using the system, Applicant has found that even though the vehicle is left unlocked with his keys in the ignition switch, the vehicle still cannot be stolen. Leaving the vehicle unlocked reduces the chances of the thief breaking a window. Leaving the key in the ignition switch reduces the possibility that the thief will punch out the ignition switch and destroy part of the steering column casing.

In the preferred embodiment of the invention, which will be described in greater detail, both sides of the starter are grounded to the vehicle. One side has a normally closed relay contact connected to a relay coil. When the coil is energized the relay contact is open so that the starter may be energized. A touch sensor or tape switch is connected to the coil to energize the coil but only when the tape switch, normally kept in a hidden position in the vehicle, is closed by the application of continuous pressure by the user. Even though the key is turned to the start position the vehicle will not start unless the tape switch is closed.

In another embodiment of the invention, the relay coil is energized by a switch that is normally used to energize an electrically actuated accessory, independently of the ignition switch. Such an accessory may be the door lock, the brake pedal or other device that employs electrical current. It cannot be an accessory that depends on the ignition switch, such as the vehicle's radio or the like. Thus the user by turning on the switch already mounted in the vehicle to energize the door lock, also energizes the relay coil to open one of the grounded connections between the starter and the battery. Turning on the ignition switch energizes the starter.

In each case, the vehicle is always protected when the user has left the vehicle. Only by first energizing an accessory that uses electrical energy can the starter be energized. A siren is connected to the ignition switch so as to be energized if the ignition key is turned to the "start" position, but the accessory switch has not been manipulated.

Still further objects and advantages of the invention will become readily apparent to those skilled in the art to which the invention pertains upon reference to the following detailed description.

DESCRIPTION OF THE DRAWING

The description refers to the accompanying drawing in which like references characters refer to like parts throughout the several views and in which.

DESCRIPTION OF THE PREFERRED EMBODIMENT

Figure 1:
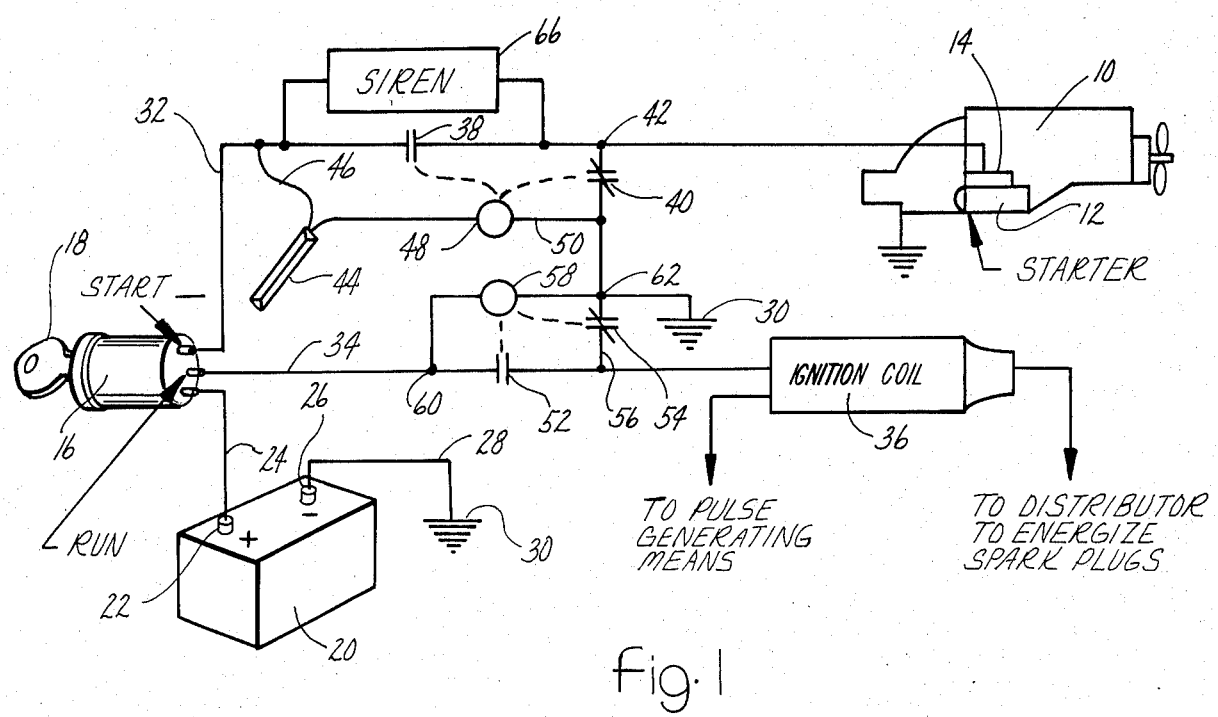
FIG. 1 is a diagrammatic view of the preferred embodiment of the invention.

FIG. 1 illustrates a conventional automotive engine 10 having a starter 12 operatively connected to the solenoid 14. Ignition switch 16 is operated by key 18, which is movable in the switch between a start position and an ignition contact or run position.

A 12-volt battery 20 has positive pole 22 connected by conductor 24 to switch 16, and a second, negative pole 26 connected by the conductor 28 to vehicle frame 30 to which the battery is grounded.

When key 18 is in its start position, it is operable to provide a full 12 volts through conductor 32 to starter 12. When the engine is turned over, the user releases key 18 which then moves toward its running position to de-energize the starter but to provide power through conductor 34 to ignition coil 36.

Conductor 32 connects ignition switch 16 to solenoid 14. Normally-open relay 38 is connected in conductor 32 between switch 16 and solenoid 14. A normally closed relay 40 has one side connected at 42 between relay 38 and the solenoid, and its opposite side grounded at frame 30. Thus the starter solenoid is electrically grounded at such times as relay 38 is opened and relay contact 40 is closed.

A pressure-sensitive sensor switch 44, sometimes known as a tape switch, is connected by conductor 46 to conductor 32 in a position between relay contact 38 and ignition switch 16. A relay coil 48 has one side connected to switch 44 and its opposite side connected to ground 30 by conductor 50. The relay coil is connected to relay contact 38 by relay contact 40.

Switch 44 may be located in any concealed, convenient position in the vehicle within reach of the user in the driver's seat so that he must physically apply continuous pressure to the switch to make an electrical connection between the ignition switch and relay coil 48. When relay coil 48 is energized, normally-open relay contact 38 closes to energize starter 12, and normally-closed relay contact 40 opens the connection between the starter solenoid and frame 30.

A normally-opened relay contact 52 is connected in conductor 34 between the ignition switch and the ignition coil. A normally-closed relay contact 54 is mounted in conductor 56 between conductor 34 and frame 30 so that the ignition coil is normally grounded. Relay coil 58 is connected at 60 and 62 such that when energized it closes relay contact 52 and opens relay contact 54. Thus the ignition coil is normally grounded except when key 18 is in either the run or start position in switch 16 at which time the connection between the ignition coil and ground is open so that the ignition coil can be energized.

Assuming the engine has not been started and key 18 is in the ignition switch, but not the ignition start position, if a hot wire is connected between the starter terminal and the battery, the thief experiences an electrical shock because the positive side of the battery is then connected to the ground. The user can permit another person to temporarily use the vehicle by showing him the concealed position of switch 44.

Siren 66 is connected across relay contact 38 so that if an unauthorized user should turn the key in the ignition switch without having first manipulated switch 44, the siren will be energized.

Figure 2:
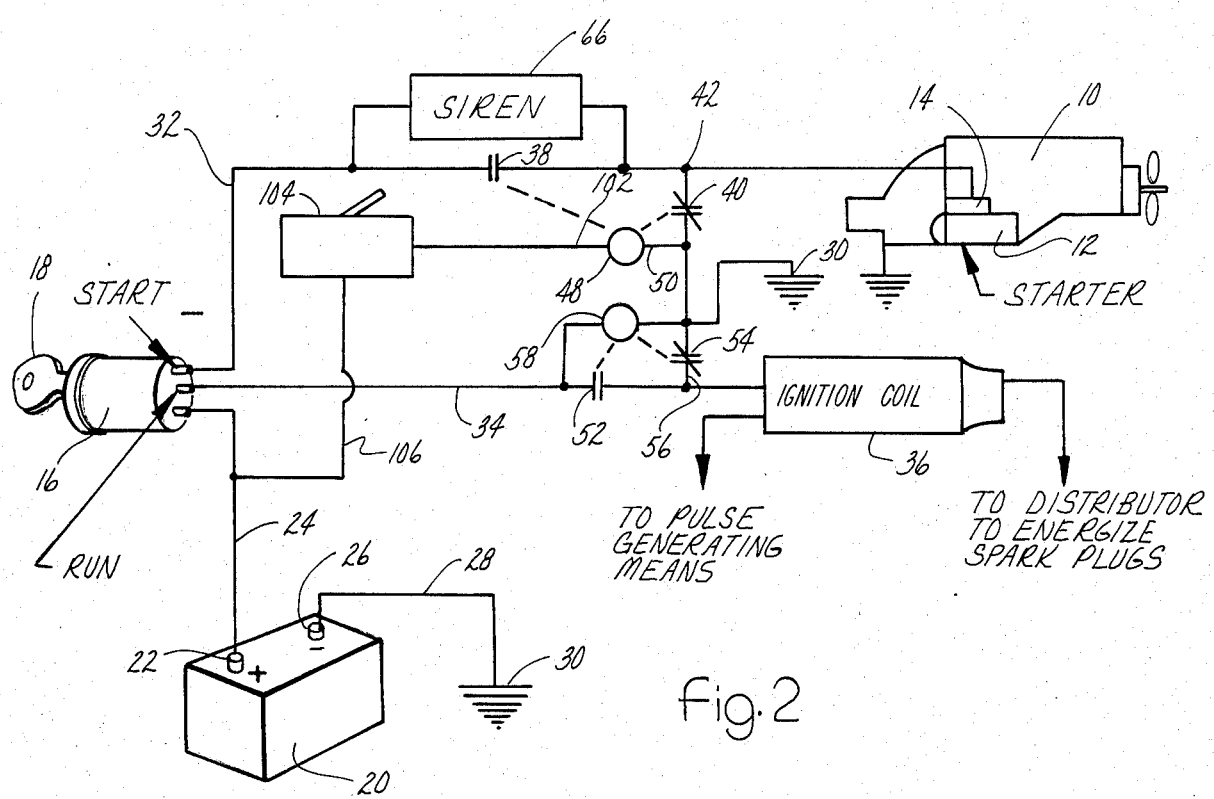
FIG. 2 is a diagrammatic view of another embodiment.

FIG. 2 illustrates another embodiment of the invention in which switch 44 and its connecting conductors have been replaced by a selected electrically-actuated accessory such as the door lock 100 (not shown). A conventional, original equipment switch 104 is connected by conductor 102 to relay coil 48 for closing relay control 38 and opening relay contact 40. Switch 104 is connected between the lock and the battery by conductor 106. This embodiment of the invention employs a switch that is already part of the original vehicle equipment. It is to be noted that the door lock is normally not energized when the user is absent from the vehicle.

Since the door lock is not energized except when the vehicle is being started, the system protects the vehicle when the user is absent from the vehicle, without the use of electical current. The vehicle cannot be started unless the user also operates the selected electrical accessory in the vehicle. Thus a thief can search for a hidden switch and never locate it because the switch that must be operated with the ignition key switch is a factory supplied component of the vehicle. Further, if the user should either accidentally or deliberately leave his key in the ignition switch, a thief believing that the vehicle is unprotected and turning the key, will only energize the siren. This is usually sufficient to scare the thief away from the vehicle. Thus deliberately leaving the key in the switch is an invitation to the thief to energize a siren, while the starter remains grounded.

Having described my invention, I claim:

1. In a motor vehicle having an engine, a vehicle frame, electrical starter means operable to turn said engine, the starter means having a pair of electrical terminals, the combination comprising:
   an ignition key switch;
   a key receivable in the key switch and movable to a start position;
   a battery for providing a source of electrical energy, the battery having a first pole and a second pole;
   first conductor means electrically grounding the first battery pole to the vehicle frame;
   second conductor means electrically connecting the second battery pole to the ignition key switch;
   third conductor means electrically grounding a first of the pair of starter means terminals to the vehicle frame;
   fourth conductor means operable to ground the second of the pair of starter means terminals to the vehicle frame;
   means for electrically connecting the ignition key switch to the starter means including:
   a first normally-open relay contact connected between the ignition key switch and the starter means;
   a first normally-closed relay contact disposed in the fourth conductor means;
   first relay coil means electrically connected to both the first normally-open relay contact and the first normally-closed relay contact such that both of the terminals of the starter means are grounded to the vehicle frame at such times as the first normally-closed relay contact is closed;
   a manually-operated tape switch which makes an electrical connection only when a pressure is continuously applied thereto, and which opens such connection when such pressure is removed, the tape switch being located in a selected position in the vehicle, and being electrically connected between the ignition key switch and the first relay coil means to energize the first relay coil means such that the first normally-closed relay contact is opened, and the first normally-open relay contact is closed when said pressure is applied to the tape switch, and the first normally-closed relay contact is closed and the first normally-open relay contact is opened when said pressure is removed from the tape switch;
   whereby the starter means may be energized only when the ignition key is disposed in the start position in the ignition key switch and said pressure is continuously applied to the tape switch; and
   including siren means electrically connected between the ignition key switch and the starter means such that the siren means is electrically energized when said pressure has not been applied to the manually-operated switch but the ignition key has been disposed in the start position in the ignition key switch.

* * * * *